United States Patent [19]
Silva et al.

[11] 3,924,606
[45] Dec. 9, 1975

[54] SYSTEM AND METHOD FOR MONITORING PHYSIOLOGICAL PARAMETERS

[75] Inventors: José R. Silva; John M. Narrace, both of Laredo, Tex.

[73] Assignee: José R. Silva, Laredo, Tex.

[22] Filed: Nov. 23, 1973

[21] Appl. No.: 418,400

Related U.S. Application Data

[63] Continuation-in-part of Ser. No. 334,743, Feb. 22, 1973, Pat. No. 3,875,930.

[52] U.S. Cl............................ 128/2.1 B; 128/2.1 M
[51] Int. Cl.²......................................... A61B 5/04
[58] Field of Search...... 128/2.05 T, 2.06 A, 2.06 F, 128/2.06 R, 2.1 A, 2.1 B, 2.1 M, 2.1 R, 205 P, 205 R, 205 S

[56] References Cited
UNITED STATES PATENTS

| | | | |
|---|---|---|---|
| 2,829,638 | 4/1958 | Douglas | 128/2.1 Z |
| 2,918,054 | 12/1959 | Goolkasian | 128/2.05 T |
| 3,316,897 | 5/1967 | Weidinger | 128/2.06 R |
| 3,453,546 | 7/1969 | Fryer | 128/2.1 A |
| 3,456,212 | 7/1969 | Partridge | 128/2.05 T |
| 3,495,596 | 2/1970 | Condict | 128/2.1 B |
| 3,513,832 | 5/1970 | Klemm et al. | 128/2.05 R |
| 3,603,881 | 9/1971 | Thornton | 128/2.1 A |
| 3,648,686 | 3/1972 | Payne | 128/2.1 Z |

Primary Examiner—William E. Kamm
Attorney, Agent, or Firm—Bard, Springs, Matthews & Jackson

[57] ABSTRACT

Methods and apparatus are provided for generating a continuous audible indication of a physiological parameter such as human skin resistivity and the like, suitable either for comparison with a preselected calibration value or for correlation with a functionally related other physiological parameter.

9 Claims, 6 Drawing Figures

SYSTEM AND METHOD FOR MONITORING PHYSIOLOGICAL PARAMETERS

Related Patents and Patent Applications

This is a continuation-in-part of the co-pending patents application Ser. No. 334,743, now Pat. No. 3,875,930, which was filed Feb. 22, 1973.

Background of Invention

This invention relates to methods and apparatus for observing physiological parameters of the human body and the like and, more particularly, relates to methods and apparatus for providing a continuous audible indication of a selected physiological parameter either for comparison with a preselected calibration value or for correlation with a different but functionally related physiological parameter.

It is well known that the human brain generates electrical pulsations at frequencies which are functionally related to mental and physical condition, and it is now well known that there are certain definite frequency ranges wherein the mental activity and capability of a person differs to a distinguishable degree. More particularly, the human brain provides pulsations in the "Beta Range" (above 14 cps) when a person is "wide awake" and in a normally active state, and that the frequency is in the "Delta Range" (below 4 cps) when the person is in a deep sleep or coma condition. When the brain wave frequency drops to zero, of course, the person is physiologically and mentally dead.

Between these two frequencies is the "Alpha Range," wherein the frequency rate falls between 7–14 cps, and the "Theta Range," wherein the rate is between 4–7 cps. The existence and significance of these ranges have only recently been recognized and are not yet fully understood, since no two human beings ever react exactly the same. Nevertheless, it is now clearly apparent that when a person's brainwave frequencies are within the Alpha range, a person is often imbued with significantly greater powers of concentration and a deeper inner awareness, and frequently with an enhanced capacity for such powers as extrasensory perception and the like. Relatively little experimentation has been done with regard to the Theta range, but subjects have sometimes exhibited extraordinary capabilities when in that state.

It was previously thought that a person's brain wave frequency is a completely uncontrollable condition and that a person tends to drift between Beta and Delta in an entirely involuntary manner. For this reason, established scientific and medical opinion has, until recently, tended to look with skepticism on claims advanced on behalf of esoteric practices such as yoga, transcendental meditation, etc. Now, however, conditioning exercises have been devised and made available whereby an experienced practitioner of otherwise ordinary capacities can shift his brain wave frequency rate into the Alpha range to obtain benefits such as those hereinbefore mentioned. Since these conditioning exercises are formulated and based on accepted scientific theory rather than on the more philosophical and metaphysical beliefs adhered to by practitioners of yoga and transcendental meditation, and since the effects obtained by such exercises are repeatable to a much greater degree, they are now widely accepted in conventional scientific circles.

Insofar as the measurement of human brain waves is concerned, it is old and well known, as evidenced by U.S. Pat. Nos. 3,662,746 and 3,623,477, to derive an electroencephalographical voltage signal indicative of such waves of pulsations. This signal may be visually or even audibly displayed, or it may be graphically recorded to provide what is popularly known as an "EEG." Thus, conventional detection and recording apparatus is used to monitor the subject using the aforementioned conditioning exercises, in order to establish when and if the subject actually enters the Alpha state. For example, see the December 1972 issue of *Electronics World*, pp. 33–38, and also U.S. Pat No. 3,548,812, for a fuller discussion of experimentation utilizing such measurements. See also U.S. Pat. Nos. 2,860,627, 3,662,746 and 3,658,054 for other discussions of conventional apparatus of this type.

The conditioning exercises hereinbefore referred to are comprised of a series of predetermined mental images which the subject or practitioner formulates according to prescribed sequence, and no external agency is actually required as such. Since the practitioner seldom if ever experiences any physical sensation when shifting to the Alpha state, some users of the exercises have practiced the technique while connected to electroencephalographic apparatus in order to indicate that the Alpha state has in fact been attained, as indicated in the aforementioned article in *Electronics World*. Further, in some cases the encephalographic signal has been translated into an audio output, whereby the frequency of the signal will inform and, to a limited extent, guide the practitioner in attaining the Alpha state. This technique is often of advantage in assisting or guiding a practitioner of limited experience and confidence. Nevertheless, the same audible signal which assists and guides the practitioner in descending out of the Beta range is also a disadvantage when the practitioner approaches and enters the Alpha range. A subject is not in a hypnotic state when in the Alpha range, of course, and is still fully aware of his surroundings and in complete control of his faculties. Hence, the audible signal can often be a distraction which impedes rather than assists the practitioner at the very moment he is at the threshold of the Alpha range.

Because of this disadvantage, it is conventional when utilizing the assistance of the audible representation of the practitioner's brain wave frequency to employ the assistance of another person to monitor the signal and disconnect it as the practitioner enters the Alpha range. However, this is also undesirable for the obvious reason that the conditioning exercises are designed for self use, and it defeats the entire purpose of the technique if another person is required to be in attendance.

These and other advantages of the prior art are overcome with the present invention, and novel methods and apparatus are herewith provided for monitoring and assisting the user of such conditioning exercises without the aid and attendance of another party.

Summary of Invention

In an ideal embodiment of the present invention, a conventional headgear-type assembly of electrodes is provided in conjunction with other conventional circuitry for generating a train of electrical pulses or waves in functional relationship to the electrical pulses which are produced by the brain of the wearer of such electrodes. In addition, however, means is further included to provide an audible indication of the rate of occurrence of such pulses. Accordingly, a second signal source is also preferably included for the purpose of generating a second signal having an audible indication of a fixed preselected frequency characteristic, such frequency characteristic corresponding to the brain wave frequency sought to be obtained by the wearer of the electrodes.

Since both the measurement signal and the standard signal are both intended to be heard simultaneously by the subject person, it is desirable to couple both such signals to a single audio speaker circuit. In order that such signals can be distinguished, one from the other, however, it is preferable for such purposes that each signal be of a different fixed pitch or tone. Accordingly, the frequency characteristics of the signals which are of interest will necessarily be of some manifestation other than tone or pitch.

In the ideal embodiment of the present invention, the brain wave measurement signal is applied to a triggered oscillator, which is adapted to generate a fixed tone signal, but which interrupts such signal upon the receipt of each wave or pulse in the brain wave signal. Hence, the output of the triggered oscillator will be composed of a sequence of discrete tone bursts, and although the frequency of such bursts is below the normal audio frequency range, the occurrence of such bursts will nevertheless be manifested to the subject person.

The second signal source will also produce a similar type of output signal, except that the tone of this second signal will be distinctly different from the tone of the first signal, and except that the occurrence of the tone bursts composing the second signal will be at a fixed preselected rate corresponding to the brain wave frequency sought to be achieved. Thus, it will be clearly apparent when the subject person has succeeded in reducing his brain wave frequency to that represented by the rate of occurrence of the tone bursts composing the second or monitor signal.

As the practitioner descends through the Beta range, the practitioner can hear the monitor signal decline in frequency and approach that of the preselected frequency with which he seeks to relate. In the present invention, however, means is also provided whereby both audio output signals will become suppressed when they approach frequency coincidence, and whereby such suppression will continue so long as the two signals remain within a certain preselected range of frequency differences.

As hereinbefore stated, there is an apparent though not fully understood correlation between a person's physiological and phychological performances, and thus it is often useful to measure and observe one or more such physiological characteristics in conjunction with the use of the conditioning exercises. Ideally, therefore, the apparatus of the present invention will further include a galvanic circuit for correlatively measuring skin resistivity and for applying such measurement to the speaker in the form of an audio signal of distinguishable character.

As will hereinafter be described in detail, an ideal form of such apparatus will include means for first deriving a voltage which is representative of the skin resistivity of the subject person, additional means such as a voltage controlled oscillator to provide a square wave output having a frequency which is functionally related to such voltage, and finally a fixed tone generator and speaker circuit for deriving an audible indication of such skin resistivity. More particularly, the initial skin resistivity measurement may be obtained by means of a pair of thumb-press electrodes or the like to generate the voltage which is used to modulate the aforementioned voltage controlled oscillator. To this extent, the subject technique and apparatus of the invention parallels the prior art as exemplified by the teachings of U.S. Pat. No. 3,648,686. To accomplish or provide the second and third steps or stages of the process or apparatus of the invention, however, the voltage controlled oscillator and fixed tone generator are substituted for the variable tone generator utilized in the said U.S. Pat. No. 3,648,686 to drive the speaker circuit.

It should be noted in this regard that the voltage controlled oscillator and fixed tone generator are not mere alternatives for the variable tone generator, whereby a signal of different form is obtained which is more suitable to present purposes. What is not readily apparent is that skin resistivity in the average person tends to vary only within relatively narrow functional limits. This is not a problem in the devices and other teachings of the prior art; relatively small changes in the frequency of an audible tone signal are usually clearly discernible by the average listener. In the case of the present invention, however, it should be noted that small changes in the rate or frequency at which a fixed tone signal is interrupted are much more difficult for the average person to detect and evaluate. Thus, in the present invention the voltage amplifier in the initial stage or step is necessarily adapted to provide for much more intensive amplification of the signal originating across or between the two thumb-press electrodes, whereby such variations are rendered but more apparent.

But this, in turn, creates a problem with respect to linearity of the output signal from the amplifier, which problem did not exist with the circuits and techniques of the prior art. This problem has been overcome, however, by the use of a voltage amplifier of improved design whereby greater linearity of output voltage is provided, as will hereinafter be explained in detail.

It is therefore a feature of the present invention to provide means and method for making an audible comparison of one or more selected physiological parameters of a human being, with either one or more other such parameters, or with a preselected calibration or monitoring signal.

It is another feature of the present invention to provide means and method for generating a fixed audio frequency tone signal and for interrupting such signal at a frequency functionally representative of a preselected physiological parameter.

It is also a feature of the present invention to provide means and method for making an audible comparison of the rate of occurrence of human brain waves with a preselected rate of occurrence.

It is also a feature of the present invention to provide means and method for generating an audible tone signal having a frequency characteristic related to the frequency of human brain waves and to compare such tone signal with another tone signal having a preselected frequency characteristic.

It is a further feature of this invention to generate a tone signal, to interrupt such signal as a function of measured human brain waves, and to compare such signal with a calibration signal which is interrupted at a fixed preselected rate of occurrence.

It is another feature of the invention to generate an audible tone signal of one pitch and with interruptions at a rate corresponding to the frequency of human brain waves and to compare such signal with an audible calibration signal of a different pitch and having interruptions at a preselected frequency.

It is a further feature of the present invention to compare an audible indication of human brain wave frequency with an audible calibration signal of a preselected frequency and to suppress such signals whenever they approach or attain frequency coincidence.

It is also a feature of the present invention to generate a first audible tone signal of one pitch interrupted sequentially as a function of the brain wave frequency of a subject, to simultaneously generate a second audible tone signal of another pitch interrupted sequentially as a function of another parameter such as skin resistivity, and to suppress both tone signals upon coincidence of their rates of interruption.

These and other features and advantages of the present invention will become apparent from the following detailed description, wherein reference is made to the figures in the accompanying drawings.

In the Drawings

Detailed Description

Figure 1:
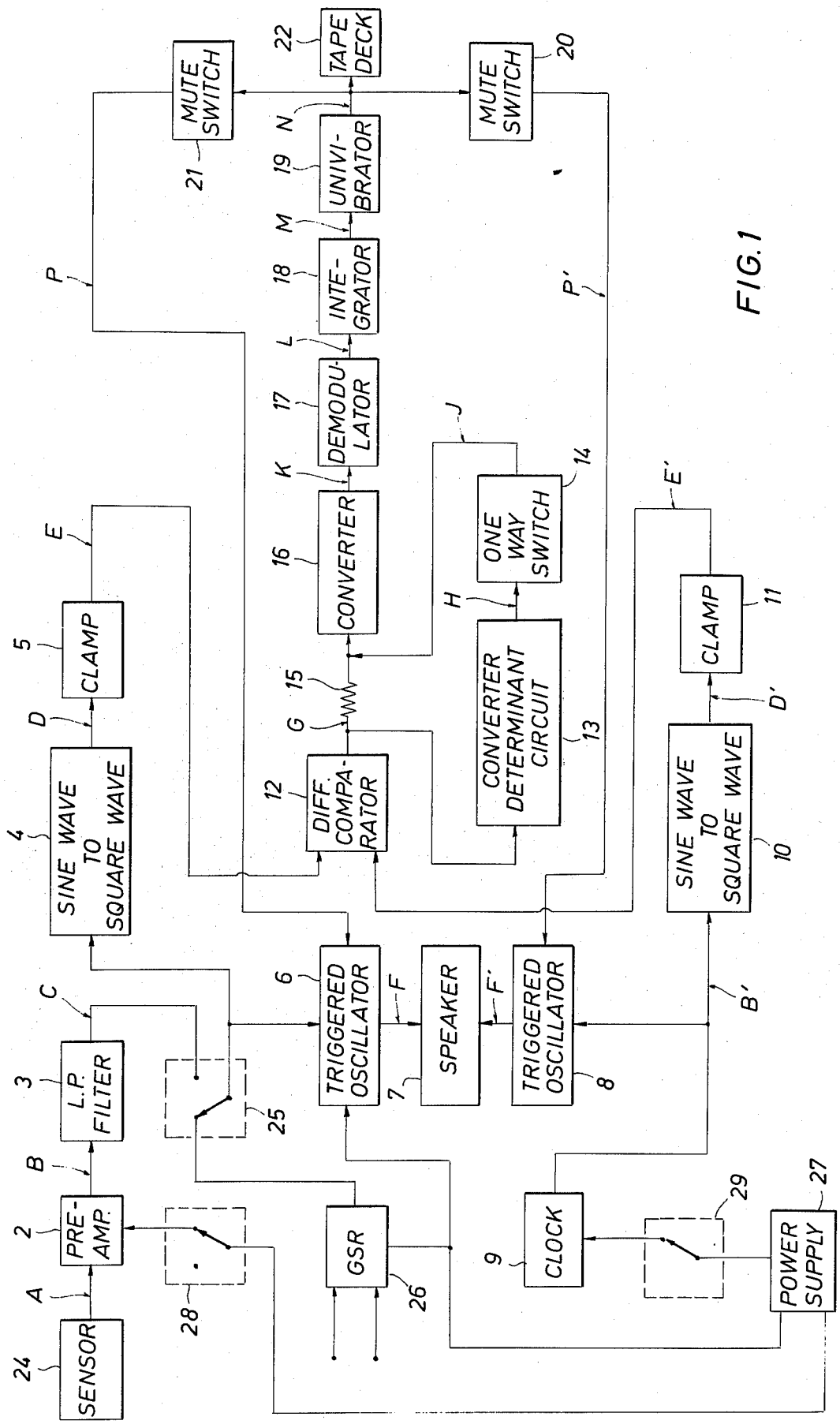
FIG. 1 is a simplified functional diagram of one form of apparatus embodying and suitable for practicing the concepts of the present invention.

Referring now to FIG. 1, there may be seen a simplified functional representation of a system embodying the concepts of the present invention and basically composed of a monitoring section for producing an audible indication of a person's brain wave frequency, and a calibration section for correlatively producing an audible indication of the brain wave frequency sought to be attained by such person. As further indicated in FIG. 1, the system may also include a third section for producing a correlative and preferably audible indication of a selected physiological feature of the subject person, such as heart beat, breathing rate, body temperature, skin resistivity or the like.

In particular, the monitoring section may include a suitable brain wave sensor 24 such as that depicted in U.S. Pat. No. 3,658,054, for generating an output signal A which is representative in configuration and frequency of the brain waves produced by the subject person. Since the amplitude of signal A is extremely low, it is preferably applied to a conventional amplifier 2 which, in turn, produces a functionally related output signal B of suitable amplitude.

As hereinbefore indicated, the electrode or sensor 24 operates to detect and conduct brain wave signals emitted by the subject. Signals emanating from the brain are quite small in amplitude, and thus the sensor output signal A, and also the amplified signal B, will often include other unwanted pulses originating from sources in the vicinity or noise in the circuits represented in FIG. 1. Accordingly, signal B is preferably applied to a suitable filter circuit 3 for producing an output signal C which is an amplified representation of the subject's brain waves, but which is also substantially free of spurious indications.

In some applications of the technique hereinbefore discussed, it is preferred that an audible representation of the subject's brain wave characteristics be provided only when the subject attains the Alpha "level." Accordingly, the filter 3 may be a low-pass circuit adapted to pass only signals having a frequency less than 14 cps or some other preselected level.

Referring again to FIG. 1, it may be seen that output signal C may be applied to one of the two input terminals of a suitable selector switch 25 having its output terminal coupled to the input of a triggered oscillator 6 and also to the input of a wave reshaping circuit 4 of suitable design. The purpose of the triggered oscillator is preferably to generate a constant tone signal of a predetermined audible pitch in response to either the positive or negative portion of each undulation in signal C. Accordingly, it may be seen in FIG. 5 that the output signal F, which may be coupled to a suitable speaker circuit 7, is composed of a sequence of discrete tone signals which occur in functional response to each brain wave signal emitted by the subject person and conveyed by the sensor 24 (unless eliminated by the filter circuit 3).

Referring again to FIG. 1, it may be seen that the calibration section of the depicted apparatus may include a suitable pacing or clock circuit 9 for generating a sinusoidal signal B' corresponding in frequency to the brain wave frequency sought to be attained by the subject person. Accordingly, the clock circuit 9 may be a variable oscillator of any conventional design which includes means for adjusting the frequency of its output as desired. Since the signal B' may be produced without the incorporation of noise or any of the other spurious indications hereinbefore mentioned, it may be applied without filtering directly to the input of a second triggered oscillator 8, and also to the input of a second wave reshaping circuit 10, in the same manner as hereinbefore explained with respect to signal C. Thus, the output signal F' from the second triggered oscillator 8 will be similar in configuration to the other output signal F.

It is a preferred feature of the present invention to apply both signals F and F' to the same speaker circuit 7, rather than to separate speaker components as in the case of the prior art. As hereinbefore stated, however, it is preferable that F and F' be audibly distinguishable from each other, and thus it is preferable that the tone of F be significantly different from the tone of F'.

Referring again to FIG. 1, it may further be seen that the system may also include a third section for measuring and indicating a selected physiological characteristic of the subject person. Accordingly, there may be included a second sensor 26 which may be a simple psychogalvanometer such as the "Lie Detector" Model 28-182 which is manufactured by Allied Radio Shack, and which produces a frequency signal representative of the skin resistivity of the subject. This output signal may be applied directly to the speaker circuit 7 to provide a third distinguishably different tone signal, or it may be connected to the other input terminal of the selector switch 25. Thus, whichever input is selected by the selector switch 25, it will be applied to the first mentioned triggered oscillator 6 which, in turn, will generate a signal F for application to the speaker circuit 7.

The system will preferably be provided with a suitable power supply 27 and a suitable on-off switch 29, whereby power can be selectively applied to the clock circuit 9 and to the other components which either compose or functionally relate to the calibration section of the system. Accordingly, the power supply 27 may also be similarly connected through a second on-off switch 28 to the amplifier 2 and the other system components which either compose or relate to the monitoring section of the system, whereby the subject may utilize either or both of these two sections as desired.

It will be seen in FIG. 1 that power may be supplied continuously to the physiological sensor 26 at all times the system is activated, and thus the power supply 27 will preferably include suitable on-off means (not depicted) whereby the entire system may be inactivated whenever desired. Alternatively, the selector switch 25 may be ganged with another selector switch (not depicted) which connects power to the sensor 26 and its circuitry whenever the selector switch 25 is positioned to select the output of the sensor 26, and which disconnects power to the sensor 26 and its circuitry whenever the selector switch 25 is positioned to select signal C from the low pass filter 3.

Figure 5:
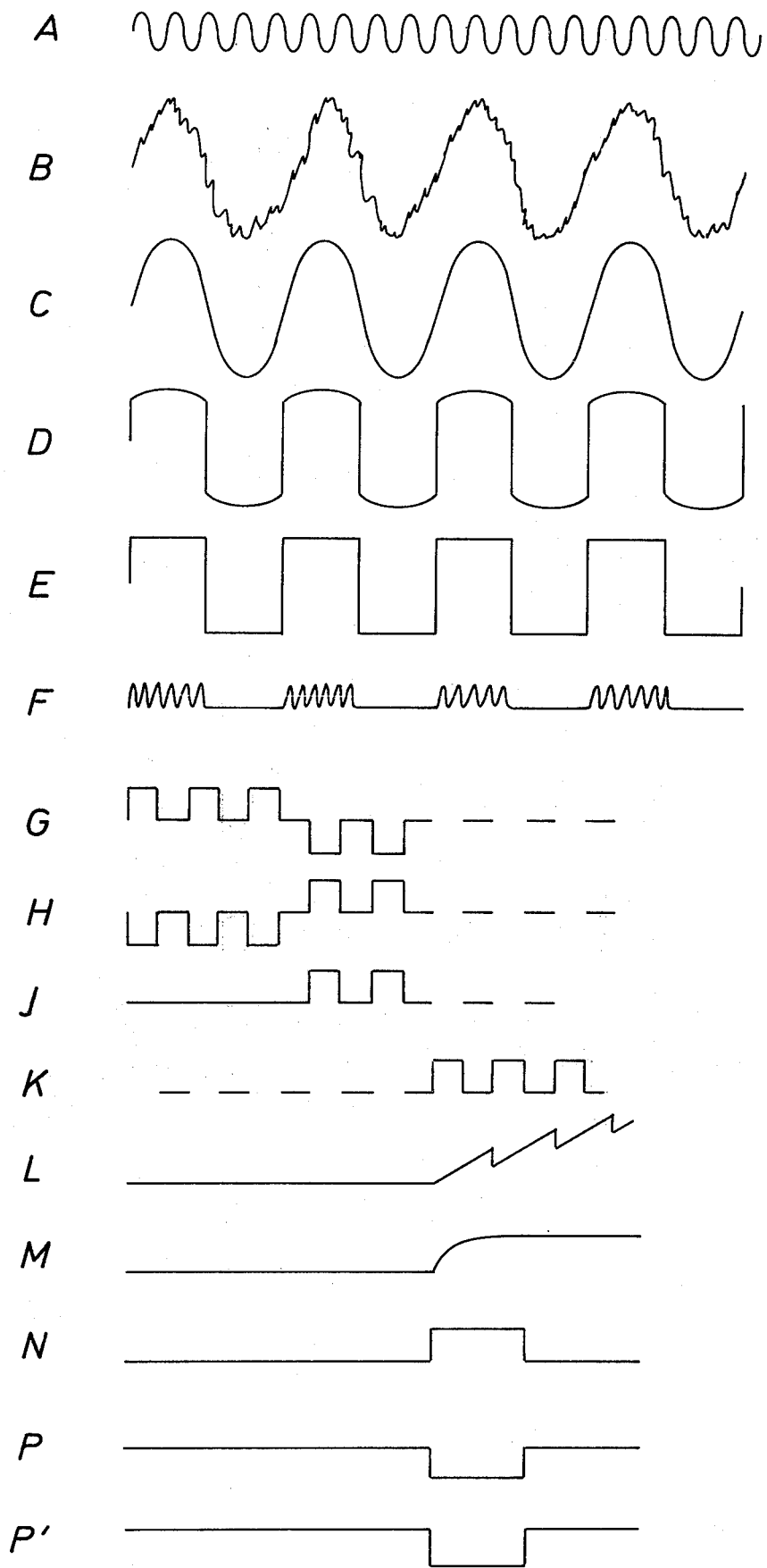
FIG. 5 is a simplified diagrammatic representation of the wave forms of various signals occurring at selected locations throughout the apparatus depicted in FIGS. 1–4.

As hereinbefore stated, it is a feature of the ideal embodiment of the invention to provide for suppression of one or both of the two signals F and F' whenever the actual brain wave frequency of the subject approaches or reaches the Alpha range (or some other predetermined frequency). Accordingly, the system may include the two wave reshaping circuits 4 and 10 which may be of any suitable design, but which are preferably of a design for translating a sine-type wave form into a square wave pulse. Even so, most circuits of this type which are of conventional design will produce waves which are only substantially squarish in shape and which have rounded peaks as indicated in FIG. 5. As will hereinafter be apparent, therefore, it is especially desirable that signals be produced from signals D and D', respectively, which are of the same uniform amplitude. Accordingly, there is preferably included a conventional clamping circuit 5 for producing an appropriate square wave frequency E from input signal D, and another similar clamping circuit 11 for producing another square wave frequency E' from input signal D' and equal in amplitude to frequency E.

Referring again to FIG. 1, it may be seen that the two square wave frequencies E and E' may be applied to the inputs of an appropriate frequency differential comparator 12. Thus, the output signal G may be seen in FIG. 8 to be composed of a train of square pulses of a polarity and frequency indicative of the difference between the signals E and E'. In other words, the frequency of the pulses in signal G will be representative of the frequency differential between signals E and E', and the polarity of the pulses in signal G will indicate whether the frequency of signal E is greater or less than the frequency of signal E'.

Referring again to FIG. 1, it will be seen that the output signal G from the comparator 12 is applied to a sampling resistor 15 which, in turn, is connected to the input of a suitable converter circuit 16 adapted to produce an output signal K composed of square pulses of either positive or negative polarity for each input pulse it receives from the comparator 12. More particularly, the converter 16 produces a zero output in response to a positive input, a positive output in response to a zero input, and a positive output in response to a negative input. Accordingly, there is preferably provided a suitable converter determinant circuit 13 and one-way switch 14 to eliminate the unwanted propensity of the converter 16 to produce a positive signal K whenever the output signal G from the comparator 12 is negative. Thus, and as will hereinafter be explained in detail, the converter determinant circuit 13 is preferably arranged and adapted to generate an output signal H which is composed of a negative pulse for each positive pulse in signal G, a positive pulse for each negative pulse in signal G, and a zero output whenever the output of the comparator 12 is zero. Signal H is applied to the input of a suitable one-way switch 14, however, which passes only positive inputs. As illustrated in FIG. 5, the output signal J from the one-way switch 14 will be composed of a positive pulse for each negative pulse in signal G, whereby the only pulses reaching the input of the converter circuit 16 will be the positive pulses in signal G, or the positive pulses of signal J.

It should be noted that what is eventually desired for present purposes is to produce a DC signal suitable for performing a gating function. Hence, the square pulses in signal K are preferably applied to a demodulator circuit 17 suitable for generating an output signal L of better configuration. As illustrated in FIG. 5, however, output signal L is clearly not of gating configuration, and thus signal L may then be applied to conventional integrating circuit 18 to produce an output signal M which is better suited to actuate a gate 19 which may either be a conventional monostable multivibrator or univibrator circuit. Thus, whenever the univibrator circuit 19 is triggered by an input signal M, it generates an output gating signal N as indicated in FIG. 5, and this signal N may be applied to the inputs of a pair of suitable mute switches 21 and 20 having their outputs P' and P connected, respectively, to inactivate or paralyze the two triggered oscillators 8 and 6. In addition, the gating signal N may for present purposes also be conveniently connected to control the operation of another auxiliary apparatus such as a tape player 22 or the like.

As hereinbefore stated, the gate 19 may be either a monostable multivibrator or a univibrator. Accordingly, when a gating signal N is produced, it may either continue until input signal M disappears, or else the gating signal N may continue for a preselected time interval as indicated in FIG. 5. In either case, muting signals P and P' will continue only so long as the mute switches 21 and 20 are actuated.

Figure 2:
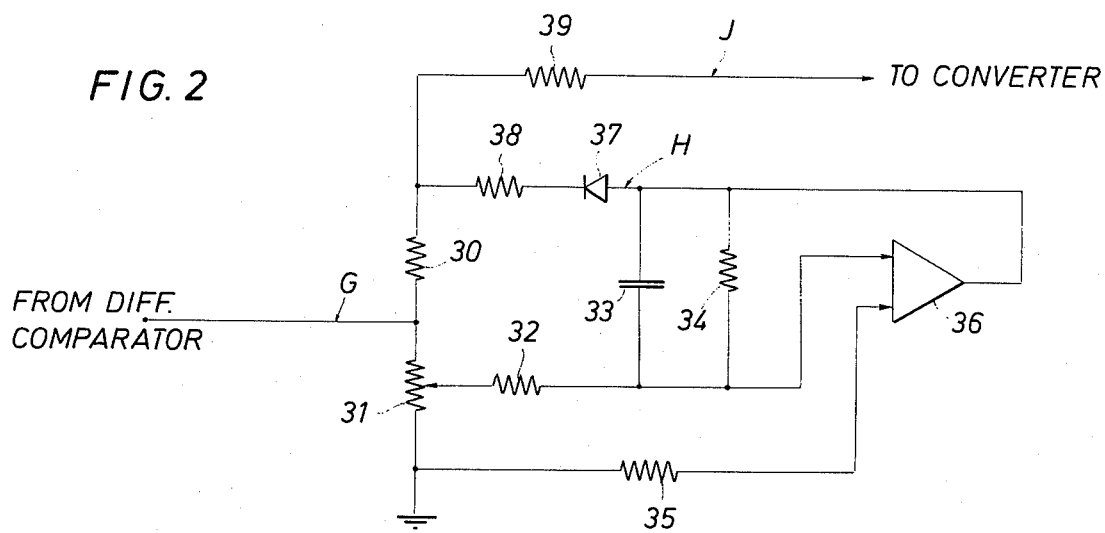
FIG. 2 is a simplified schematic diagram of a portion of the apparatus depicted more generally in FIG. 1.

Referring now to FIG. 2, there may be seen a simplified schematic representation of the converter determinant circuit 13 and one-way switch 14 depicted generally in FIG. 1, wherein the determinant circuit 13 may include a conventional potentiometer 31 having its winding connected between signal G and ground or reference potential, and further having its wiper portion connected serially with a suitable isolation resistor 32 and one input of an operational amplifier 36 having its output connected to produce signal H. The purpose of the potentiometer 31 is to provide means for establishing a suitable level for signal H, and thus the function of the resistor 32 is to prevent an unstable condition from occurring with respect to the amplifier 36 whenever the wiper of the potentiometer 31 is turned to ground or reference voltage. In addition, however, the isolation resistor 32 will also prevent excessive loading on the comparator 12 and other circuits "upstream" whenever the wiper of the potentiometer 31 is moved too far in the opposite direction.

Referring again to FIG. 2, it will be seen that the other input to the amplifier 36 is preferably coupled to ground or reference by way of a resistance 35 having a value such that the voltage of the output signal H will be zero whenever the magnitude of the input signal G is zero voltage. In addition, an additional resistor 34 of suitable value is preferably interconnected between the output and one of the inputs of the amplifier 36, to establish a proper gain for this component, and a capacitance 33 is preferably connected in parallel with the resistor 34 for purposes of integration.

The one-way switch 14 depicted in FIG. 1 may, as indicated in FIG. 2, include a conventional diode 37 having its input coupled to receive signal H from the output of the amplifier 36, and having its output connected to one end of a suitable resistor 38. The other end of the resistor 38 constitutes the output of the one-way switch 14. Hence, it will be apparent that the resistance 30 depicted in FIG. 2 will correspond to the sampling resistor 15 illustrated in FIG. 1. In addition, however, an additional resistance 39 may also be provided for further establishing the value of signal J as indicated in FIG. 2. In reference to FIG. 1, tape deck 22 is shown as a means to provide conditioning, for example, language learning. The tape deck 22 is energized simultaneously when the mute switches 20 and 21 inactivate the triggered oscillators 6 and 8, as hereinbefore explained.

Figure 3:
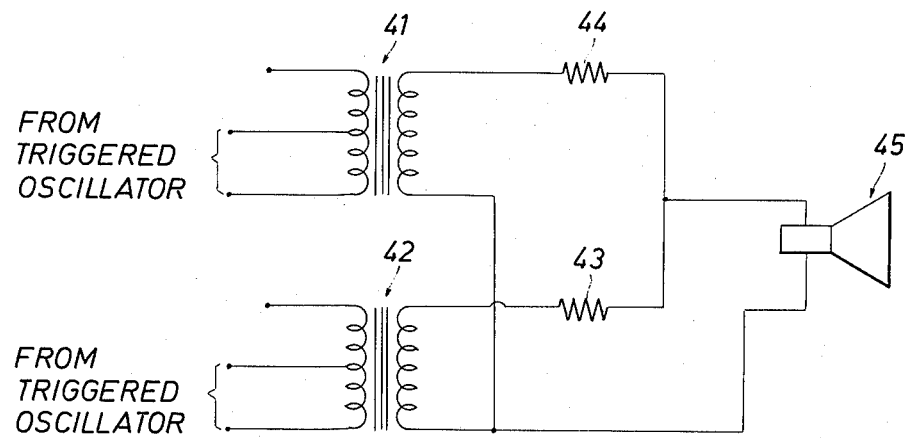
FIG. 3 is a simplified schematic diagram of another different portion of the apparatus depicted more generally in FIG. 1.

Referring now to FIG. 3, there may be seen a more detailed schematic representation of the speaker circuit 7 which is depicted only generally in FIG. 1, wherein the output signals F and F' from the two triggered oscillators 6 and 8 may be suitably connected to the primary windings of suitable step-down transformers 41 and 42, respectively. Accordingly, the secondary winding of the first transformer 41 is preferably connected at one end to one input of a suitable dynamic speaker 45, and at the other end to a load resistor 44 of suitable value and connected, in turn, to the other input of the speaker 45. Similarly, the secondary winding of the second transformer 42 has one end coupled to one input of the speaker 45, and has its other end coupled through another load resistor 43 of suitable value to the other side of the speaker 45. It will thus be apparent that the function of the resistors 44 and 43 is to isolate input signal F from input signal F', and also to balance these signals as they are received by the speaker 45.

Figure 4:
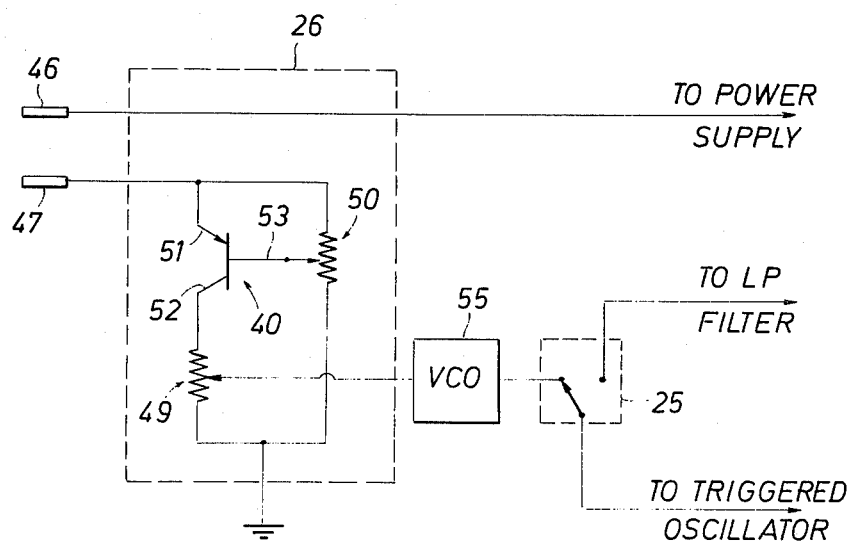
FIG. 4 is a simplified schematic diagram of a further different portion of the apparatus depicted more generally in FIG. 1.

Referring now to FIG. 4, there may be seen a more detailed schematic representation of the galvanic skin resistance measurement circuitry 26 depicted only generally in FIG. 1. In particular, it may be seen that this circuit may include any suitable means for deriving a voltage representative of the skin resistivity of a person, such as a pair of electrodes 46 and 47 of a design such that they may be detachably affixed to the skin of the person. One contact electrode 46 may be coupled directly to the power supply 27 depicted in FIG. 1, but the other contact electrode 47 is preferably coupled to the junction between the winding of a first potentiometer 50 and the emitter 51 of a suitable transistor 40 having its collector 52 coupled to the winding of a second potentiometer. The base electrode 53 of the transistor 40 is preferably coupled to the wiper of the first potentiometer 50, which has its winding coupled between the second contact electrode 47 and the junction between ground or reference voltage and the other end of the winding of the second potentiometer 49. As also indicated in FIG. 4, the wiper of the second potentiometer 49 is preferably connected to the input of a voltage controlled oscillator 55 of conventional design such as to produce an output frequency which is preferably below the audio range, and which is functionally related or proportional to the skin resistivity measured between the two electrodes 46 and 47. Accordingly, this sub-audio output frequency is preferably connected to one input terminal of the selector switch 25, whereby this sub-audio frequency may be selected for coupling to the input of the first triggered oscillator 6 depicted in FIG. 1.

Referring again to FIG. 4, it will be apparent that the resistance between the two contact electrodes 46 and 47 will be a function of the skin resistivity of the subject person, and that any change in such skin resistivity will therefore produce a functionally related current change across the second potentiometer 49. Any change in the resistance in the emitter circuit 51 produces a corresponding or functionally related change in the current across the winding of the second potentiometer 49, and this, in turn, produces a corresponding or functionally related change in voltage across the potentiometer 50. It is this voltage, of course, which is employed by the triggered oscillator 6 to establish the value of its output frequency F, and thus the value of the signal F is a function of the skin resistivity of the subject person.

It should be noted, however, that the tone of the output signal F from the triggered oscillator 6 is of a constant preselected pitch indicative of the source of the signal as hereinbefore stated. Accordingly, and as indicated in FIG. 5, it is the rate of occurrence of each discrete segment or portion of such tone signal which is representative of the skin resistivity of the subject, rather than the pitch or tone of the signal. In this respect, it should be noted that the frequency or occurrence rate of the segments of the signal may be indicated by maintaining a fixed duration of silence between each segment or tone burst of the signal, and by varying the duration of the tone bursts or segments accordingly. In the alternative, the tone bursts or segments may all have the same fixed duration, and the periods of silence therebetween may be varied as desired.

It will be readily apparent that various alternative types of circuits and components may be used to perform many of the various functions hereinbefore described. For example, circuitry for determining heart beat, breathing rate, and other physiological phenomena may be substituted for the galvanic skin resistivity circuit 26, as hereinbefore mentioned. In addition, a conventional arrangement of AND gates or other such logic circuits may be substituted for the univibrator or monostable multivibrator employed as the gate 19, and perhaps for the integrator 18 and demodulator 17 as well. Also, it will be apparent that signals F and F' may be used to activate human senses other than hearing.

Figure 6:
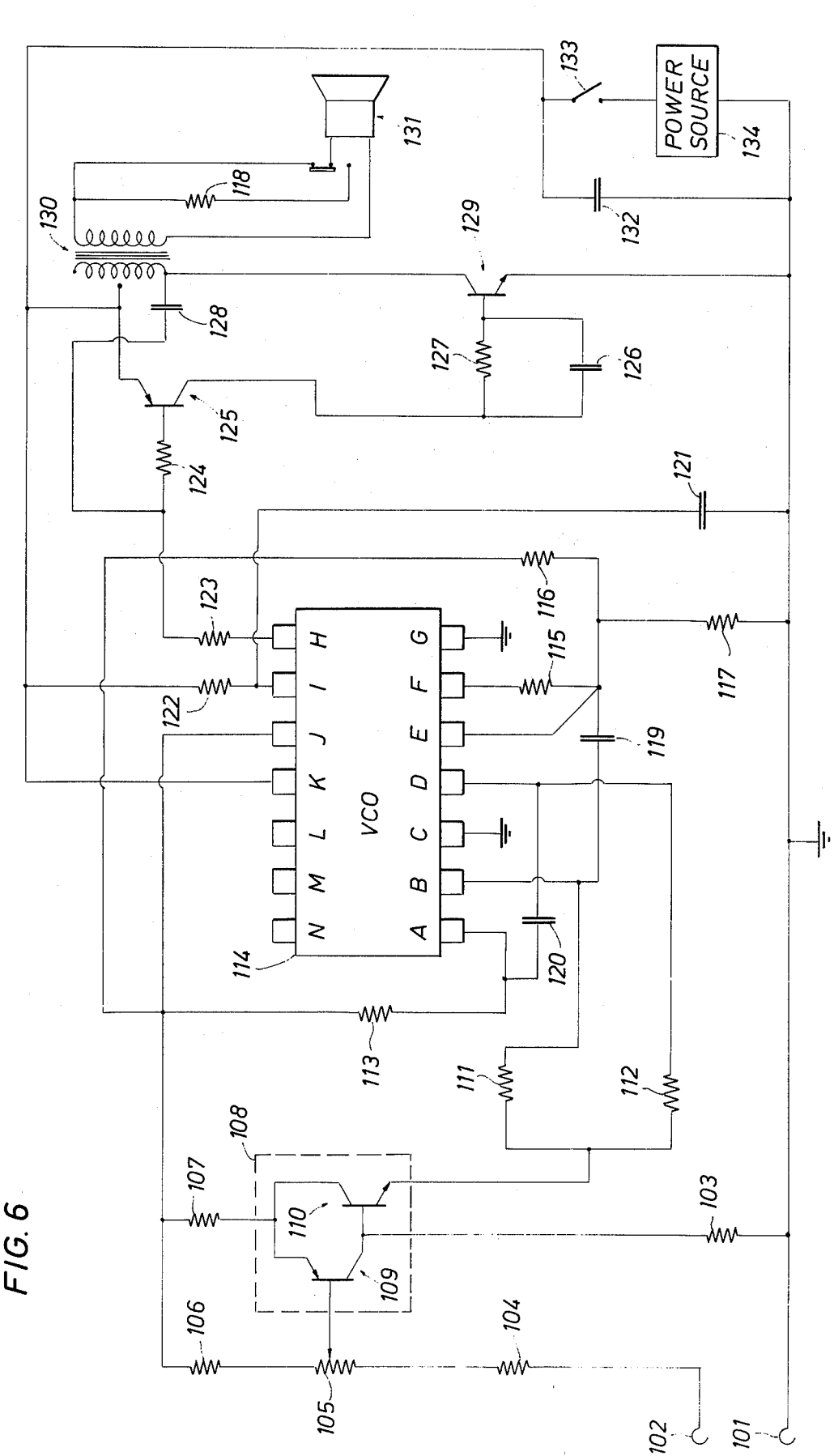
FIG. 6 is a more detailed schematic diagram of a preferred embodiment of portions of the apparatus depicted in FIGS. 1 and 4.

Referring now to FIG. 6, there may be seen a schematic diagram of another form of monitoring device incorporating the galvanic skin resistivity circuit 26 and other apparatus hereinbefore described and suitable both independent of or in conjunction with the circuitry depicted in FIG. 1. In particular, there may be seen a pair of thumb-press electrodes 101–102 of conventional design which are connected through resistances 103–104 and 106–107, and the winding of a potentiometer 105, to a DC amplifier 108 of suitable design. As will be apparent, it is preferable that the amplifier 108 have a high impedance input — low impedance output characteristic, and thus this component of the circuit is preferably composed of a PNP transistor 109 interconnected with the wiper of the potentiometer 105, and an NPN transistor 110 coupled between resistances 111-113.

Referring again to FIG. 6, there may be seen a functional representation of a voltage controlled oscillator 114 which, for present purposes, may be a Model ULN-2046A linear integrated circuit as made and sold by Sprague Electric Co., or the like. Since this oscillator 114 is commercially available on an off-the-shelf basis, its internal details will not be further illustrated or discussed except for its fourteen terminals which, in FIG. 6, are indicated by references "A" through "N." Accordingly, it may be seen that terminal J is preferably interconnected between resistances 106 and 107, that terminals C and G are connected to ground or reference voltage, that terminals B and E are preferably interconnected by capacitance 119, and that terminal F is interconnected through the resistance 115 to the junction between the capacitance 119 and resistance 117 which, in turn, is interconnected to the junction between the grounded electrode 101 and resistance 103.

Referring again to the oscillator 114, it may be seen that terminal D is interconnected with the junction between resistance 112 and a capacitance 120 which, in turn, has its opposite side coupled between terminal A and the junction between resistances 111 and 113. Terminals K and I are interconnected through resistance 122, and terminals L–N are not connected. However, terminal I is also connected by a capacitance 121 to the grounded thumb-press electrode 101.

Referring again to FIG. 6, there may be seen a schematic representation of a suitable transformer 130 having its output winding interconnected with a suitable audio speaker 131 which, for present purposes, is a dynamic-permanent magnet type component. It is also preferable for present purposes to provide for means whereby the output volume of the speaker 131 may be controlled to a limited extent. Accordingly, a "loud-soft" switch 135 and resistance 118 is also preferably connected between the output winding of the transformer 130 and the input terminals of the speaker 131.

Power may be obtained from any suitable source such as the power supply 134 interconnected between the grounded electrode 101 and a suitable on-off switch 133 which, in turn, is coupled to the junction between terminal K of the oscillator 114 and the input winding of the transformer 130. Accordingly, a suitable capacitance 132 is preferably coupled between the junction between the switch 133 and the input winding of the transformer 130, and the junction between the power supply 134 and the grounded electrode 101.

Referring again to FIG. 6, it may be seen that terminal H of the oscillator 114 is coupled through resistances 123 and 124 to the base of a PNP transistor 125 having its emitter connected to the junction between the resistance 122 and the input winding of the transformer 130. Accordingly, the collector of transistor 125 is connected through another resistance 127 to the base of an NPN transistor 129 having its emitter connected to the junction between the capacitance 121 and the grounded electrode 101, and having its collector interconnected between the input winding of the transformer 130 and a capacitance 128 which, in turn, has its opposite side connected to the junction between resistances 123 and 124. A further capacitance 126 is preferably coupled in parallel across the resistance 127.

Referring in general to the circuitry represented in FIG. 6, it will be apparent that what is depicted is an independently arranged and operating version of the galvanic skin resistivity circuit 26, triggered oscillator 6 and speaker circuit 7 depicted generally in FIG. 1. More particularly, the transistors 109 and 110, and their associated components function as the amplifier 26 illustrated in FIG. 4, the voltage controlled oscillator 114 and its associated components may be equated to the VCO 55 depicted in FIG. 4, and the speaker 131 is functionally equivalent to the speaker 45 depicted in FIG. 3. Thus, the circuitry represented in FIG. 6 provides a train of discrete bursts of an audible tone signal, wherein the tone frequency or pitch of the audible is fixed at a preselected level, but wherein the rate of occurrence of these discrete bursts of audible tone signal are a function of the skin resistivity of the subject person contacting the two thumb-press electrodes 101 and 102.

As hereinbefore stated, the circuitry depicted in FIG. 6 may be used either independently or in conjunction with one or more of the other circuits depicted functionally in FIG. 1. Furthermore, it may be used to develop an audible indication of many parameters other than skin resistivity, provided that suitable detection means are substituted for the electrodes 101 and 102 which are capable of generating an appropriate voltage representative of the magnitude of the parameter sought to be measured.

Many other variations and modifications will readily become apparent to those having experience with circuitry of the type depicted and described herein. Accordingly, it should be clearly understood that the structures and techniques described herein and depicted in the accompanying drawings are illustrative only and are not intended as limitations on the scope of the present invention.

What is claimed is:

1. A system for monitoring a variable human physiological parameter and the like, comprising
    detection means for deriving an electrical signal representative of a parameter sought to be monitored,
    voltage means for deriving from said signal a voltage having an amplitude functionally related to a characteristic of said parameter sought to be monitored,
    a tone signal generator for providing a sequence of discrete increments of tone signal each having a duration and rate of occurrence functionally related to the amplitude of said voltage, and
    audio means responsive to said increments of tone signal.

2. The system described in claim 1, wherein said tone signal from said generator has a preselected fixed pitch which is within the audio frequency range.

3. The system described in claim 2, wherein said voltage means includes an amplifier with a substantially linear amplification characteristic for amplifying said voltage.

4. The system described in claim 3, wherein said amplifier is characterized by a high impedance input and a low impedance output.

5. The system described in claim 4, wherein said audio means includes
- a dynamic-permanent magnet type audio speaker means responsive to said tone signal generator, and
- volume control means interconnected with said audio speaker means.

6. A system for monitoring the skin resistivity of a selected human subject and the like, comprising
- a pair of spaced-apart electrodes for developing a measurement voltage functionally related to the skin resistivity of said selected subject,
- an amplifier having a high impedance input and low impedance output characteristic for amplifying said measurement voltage in a substantially linear manner,
- a voltage-controlled oscillator for providing a sequence of discrete bursts of tone signal having a fixed pitch within the audio frequency range and at a rate of occurrence which is functionally related to the magnitude of said amplified measurement voltage, and
- a dynamic-permanent magnet type audio speaker for providing an indication of said discrete bursts of tone signal audible to said selected subject.

7. A method of monitoring a variable human physiological parameter and the like, comprising
- deriving an electrical signal representative of a parameter sought to be monitored,
- deriving from said signal a voltage having an amplitude functionally related to a selected characteristic of said parameter sought to be monitored,
- deriving a sequence of discrete bursts of tone signal each having a duration and rate of occurrence functionally related to the amplitude of said voltage, and
- deriving an audible indication of said bursts of tone signal.

8. The method described in claim 7, further including deriving said tone signal at a fixed preselected pitch within the audio frequency range.

9. The method described in claim 8, further including amplifying in a substantially linear manner said voltage which is derived from said electrical signal.

* * * * *